April 16, 1957 C. WEILAND 2,788,937
CENTRIFUGE FOR SEPARATING SOLID COMPONENTS FROM LIQUIDS
Filed Aug. 2, 1955
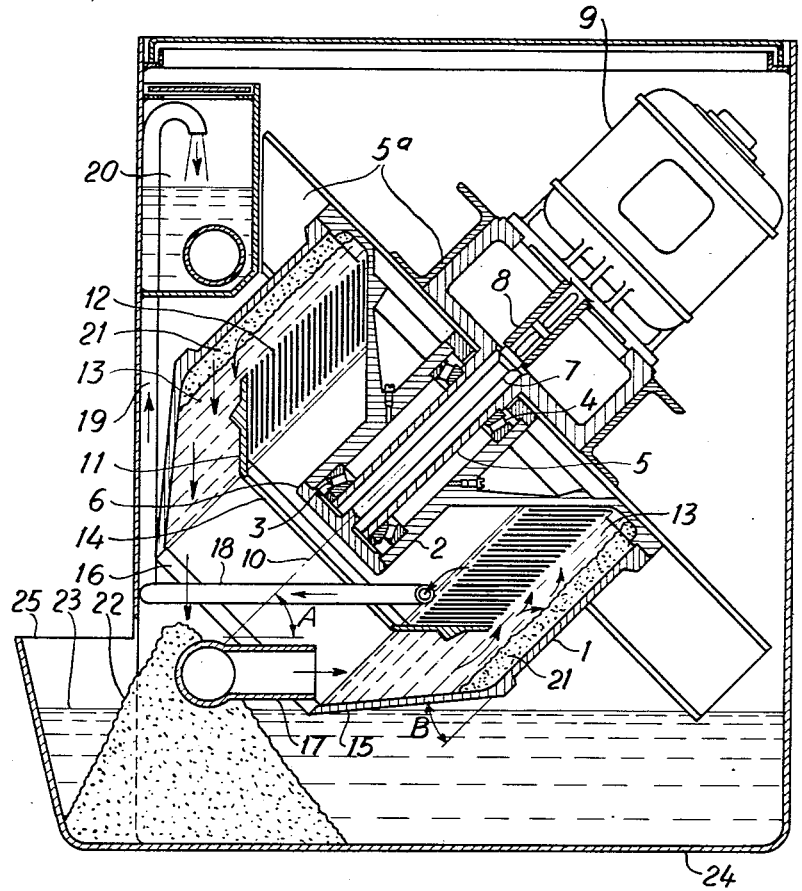
INVENTOR.
Carl Weiland
BY

United States Patent Office 2,788,937
Patented Apr. 16, 1957

2,788,937

CENTRIFUGE FOR SEPARATING SOLID COMPONENTS FROM LIQUIDS

Carl Weiland, Zurich, Switzerland, assignor to Aktiebolaget Separator, Stockholm, Sweden, a corporation of Sweden Application August 2, 1955, Serial No. 525,836

Claims priority, application Switzerland August 6, 1954

3 Claims. (Cl. 233—21)

This invention relates to centrifuges for separating solid components from liquids.

Such centrifuges as known in the art comprise a rotating centrifugal bowl in which a lamellar straining drum is concentrically arranged with respect to the rotation axis of the bowl. The liquid to be treated is fed through an inlet, and the liquid freed centrifugally from solid components enters a so-called paring tube at the inside of the lamellar drum and is thereby discharged from the centrifuge.

Heretofore, centrifuges of this type have been provided with a bowl which rotates about either a horizontal or a vertical axis, depending upon the intended use of the centrifuge. While both of these arrangements afford a good separating effect, the removal of the separated solid components from the bowl has entailed much work, long "standstill" periods and considerable cost.

The present invention eliminates these drawbacks by providing a centrifuge in which the bowl is substantially evacuated automatically as the bowl is stopped.

A centrifuge made according to the invention comprises a centrifugal bowl having a conical lower portion tapering downward to a bottom opening, and means mounting the bowl for rotation about an inclined axis, that is, an axis which is substantially inclined to both the vertical and the horizontal, preferably about 45 degrees. An inlet pipe opens generally horizontally into the bowl near the edge of the bottom opening and serves for introducing the mixture of liquid and solids into the bowl, the bowl being rotatable at a normal operating speed to deposit solids centrifugally on the inside of the bowl wall and displace liquid inwardly toward the inclined axis of the bowl. A paring tube has an opening located in position to pare this displaced liquid from the bowl and forms a liquid outlet pipe extending generally horizontally from the interior of the bowl through the bottom opening. With this arrangement, the layer of separated solids deposited around the inside of the bowl wall, during the separating operation, falls by gravity through the bottom opening when the bowl is slowed down from its normal speed incident to an interruption of the separating operation. More particularly, as the rotational speed of the bowl and therefore the centrifugal force are reduced, the deposited solids fall through the underlying bottom opening from successive portions of the bowl wall as these portions reach an uppermost position; and the residual liquid also discharges through the bottom opening.

The invention is described more in detail below in connection with the accompanying drawing, in which the single illustration is a vertical sectional view of a preferred form of the new centrifuge.

The centrifugal bowl 1 is provided with the usual central nave 2 which, by means of roller bearings 3 and 4, is rotatably mounted on a stationary hollow shaft 5. The bowl 1 is rotated through a disc 6 connecting the lower end of nave 2 with the lower end of a drive shaft 7 arranged in the hollow shaft 5. The drive shaft 7 is driven through a coupling 8 from an electric motor 9. The rotation axis 10 of the bowl is inclined to the horizontal plane at an angle A which, as shown, is about 45°, although this inclination may be at a different angle. The stationary shaft 5 is secured to a supporting framework 5a, as is the motor 9. Thus, the parts 4, 5 and 5a constitute a means mounting the bowl 1 for rotation about the inclined axis 10.

Within the bowl 1 is a lamellar straining drum 11 of conventional form comprising a nest of frusto-conical discs or rings 12 spaced from each other and concentric with the rotation axis of the bowl, with which they rotate. The drum 11 forms an annular chamber 13 with the inner wall of the bowl. The inside of the straining drum 11 is accessible through a downwardly directed opening 14.

The centrifugal bowl 1 has a conical lower portion 15 tapering downward to a circular bottom opening 16, the opening plane of which, like that of the opening 14 of the straining drum 11, is substantially normal to the rotation axis 10. The angle B which the wall of the conical part 15 forms with the main side wall of the cylindrical bowl 1 is so adjusted in relation to the angle A of the rotation axis 10 that the lower portion of the conical part 15 extends substantially horizontally.

The mixture of liquid and solids is fed through an inlet pipe 17 extending nearly horizontally through the bottom opening 16 into the inner chamber of the centrifugal bowl 1. As shown, the pipe 17 opens into the bowl inside the bottom opening 16 and close to the inner wall of the conical part 15 at its bottom portion. The liquid freed from solid components is discharged by means of a so-called paring tube 18 from the inner side of the straining drum 11, as is usual in centrifuges with a straining drum. The paring tube 18 also extends substantially horizontally and forms a liquid outlet pipe which conveys the liquid from the inside of the straining drum 11 out through the two openings 14 and 16. Due to the kinetic energy of the liquid entering the open inner end of paring tube 18, sufficient pressure is generated in the latter to force the liquid upward through an ascending pipe 19 to an outlet container 20. The feed and discharge in the present centrifuge thus take place through one and the same bottom opening 16 of the inclined bowl 1.

During operation, the bowl 1 and the straining drum 11 rotate around the axis 10. When the liquid mixed with solid components is fed through the inlet pipe 17, it is picked up by the rotating bowl and formed into an annular body against the side wall of the bowl by the centrifugal force incident to rotation of the bowl at normal operating speed, this annular body being distributed substantially uniformly over the inner surface of the side wall above the conical lower portion 15. Due to the centrifugal force, the solid components in the liquid are thrown outward toward the side wall and deposit there as a layer 21. As the feed material continues to enter the bowl, the liquid, which is freed from coarse solids in the annular chamber 13, is displaced inward through the interspaces between the conical discs 12 of the strainer drum 11, where the fine solid components deposit on the discs 12. When the liquid, thus freed to a great extent from solid components, arrives at the inner side of the straining drum 11, it is caught up by the paring tube 18 and led outside the centrifugal bowl 1.

After a substantial period of operation, when the separated solids 21 are to be removed from the centrifuge, all that is needed is to shut off the motor 9. When the centrifugal bowl 1 decelerates to such a low speed that the centrifugal force becomes less than the gravity acting upon the layer 21, this layer falls from successive portions of the inner wall of the bowl as they arrive at the uppermost position, and drops down through the bottom opening 16 and out of the bowl 1. Since the discs 12 are also inclined to the rotation axis 10, so that successive parts of these discs become substantially vertical as they reach an uppermost position, the coating of separated finer solids slides down along the discs and falls through the openings 14 and 16 out of the bowl 1. The residual liquid, which is present within the bowl 1 and the straining drum 11, also discharges through the bottom opening 16. Experience has proved that a sufficient cleaning of the bowl 1 and the straining drum 11 is obtained in this way, so that after such an interruption the centrifuge, freed from its contents, is immediately ready for operation again.

Immediately below the centrifugal bowl 1 is a container 24 for receiving the discharged material which falls through the bottom opening 16 when the centrifuge is stopped, this discharge forming a cone of material 22 in the container 24. In the container 24 is a liquid having a free surface or level 23 which, at every stopping of the centrifuge, is raised above the level shown in the drawing by the discharge through bottom opening 16, so that the liquid enters the bowl 1 through the bottom opening 16. The angle A of the rotation axis 10 and the conical angle B of the lower portion 15 of the bowl are so related to each other that when the centrifuge is again put into operation, the liquid above the lower edge of opening 16 is picked up from the container 24 by the bowl 1 under the action of centrifugal force and passes in the usual manner to and through the liquid outlet pipe 18 with the liquid component of the feed from pipe 17. In this way, the liquid surface 23 is lowered to the level shown in the drawing, that is, to the lower edge of the bottom opening 16, where it is maintained during operation.

If desired the container 24 may be shaped as a housing which completely surrounds the centrifuge except for an opening 25 for the withdrawal of the cone 22 of separated material, which may be removed either manually or automatically from the container.

I claim:

1. A centrifuge for separating solid components from liquids, which comprises a centrifugal bowl having a conical lower portion tapering downward to a bottom opening, means mounting said bowl for rotation about an inclined axis, an inlet pipe opening generally horizontally into the bowl near the edge of said bottom opening and through which the mixture of liquids and solids is fed into the bowl, the bowl being rotatable at a normal operating speed to deposit solids centrifugally on the inside of the bowl wall and displace liquid inwardly toward the bowl axis, and a paring tube having an opening located in position to pare said displaced liquid from the bowl, the paring tube forming a liquid outlet pipe extending generally horizontally from the interior of the bowl through said bottom opening, whereby upon slowing down of the bowl from said normal speed the deposited solids fall through the bottom opening from successive portions of the bowl wall as said portions reach an uppermost position, the residual liquid in the bowl also discharging through said bottom opening.

2. A centrifuge according to claim 1, comprising also a lamellar straining drum located in the bowl concentric to said axis and rotatable with the bowl, the displaced liquid being forced inward through said drum for further separation of solids, said opening of the paring tube being located adjacent the inner surface of the drum.

3. A centrifuge according to claim 1, comprising also a liquid container located directly below said bottom opening for receiving the liquid and solids discharged through the bottom opening, the liquid level in said container being above the lower edge of the bottom opening when the bowl is stationary, whereby acceleration of the bowl to its normal speed causes the liquid above said lower edge to be picked up centrifugally by the bowl, leaving the liquid level in the container at about said lower edge.

No references cited.